United States Patent [19]
Holthaus

[11] Patent Number: 5,369,982
[45] Date of Patent: Dec. 6, 1994

[54] LEAK DETECTOR

[75] Inventor: Ernst Holthaus, Bergisch-Gladbach, Germany

[73] Assignee: Leybold Aktiengesellschaft, Germany

[21] Appl. No.: 794,947

[22] Filed: Nov. 20, 1991

[30] Foreign Application Priority Data

Nov. 26, 1990 [DE] Germany ............... 4037524

[51] Int. Cl.⁵ .................................... G01M 3/04
[52] U.S. Cl. ........................... 73/40; 73/40.7; 73/49.2
[58] Field of Search ............. 73/40, 40.7, 49.2 R, 73/45.4, 46, 49.1, 49.5

[56] References Cited

U.S. PATENT DOCUMENTS

| | | | |
|---|---|---|---|
| 2,690,224 | 9/1954 | Roberts | 73/40 |
| 3,186,214 | 6/1965 | Roberts | 73/40 |
| 3,644,702 | 2/1972 | Kohler | 219/201 |
| 3,691,821 | 4/1972 | Davey | 73/49.2 |
| 4,294,107 | 10/1981 | Walle | 73/49.2 |
| 4,499,752 | 2/1985 | Fruzzetti et al. | 73/40.7 |
| 4,558,587 | 12/1985 | Fruzzetti | 73/40.7 |
| 4,794,784 | 1/1989 | Bley | 73/40 |
| 5,014,281 | 5/1991 | Hecht et al. | 372/59 |
| 5,022,265 | 6/1991 | Voss | 73/40.7 |

FOREIGN PATENT DOCUMENTS

| | | |
|---|---|---|
| 0037384 | 7/1981 | European Pat. Off. . |
| 0451543 | 2/1991 | European Pat. Off. . |
| 2422261 | 7/1974 | Germany . |
| 3038926 | 9/1982 | Germany . |
| 2130734A | 6/1984 | United Kingdom . |

OTHER PUBLICATIONS

Russian Patent No. 1451-574-A Abstract, *Test Rig of Attached Hydraulic Drive Equipment*, Derwent Publications Ltd (29 Nov. 89).

Russian Patent No. 1322-775-A Abstract, *Articles Air-Tightness Test Device* Derwent Publications, Ltd. (12 Jun. 91).

*Primary Examiner*—Hezron E. Williams
*Assistant Examiner*—George Dombroske
*Attorney, Agent, or Firm*—Harris Beach & Wilcox

[57] ABSTRACT

An apparatus for detecting leaks in a test object having chamber walls, having a first and a second side subject to differential pressure produced by production of a partial vacuum on the first side, the detection being carried out by use of a test gas present on the second side of said chamber walls. The apparatus has a vacuum pump for providing the partial vacuum, a detector for detecting the test gas, a connecting means for connecting the apparatus to the test object, and a plurality of primary control valves for controlling the leak detection process. The improvement comprises at least one of the primary control valves being actuated by a driving cylinder and a driving piston, where the piston is actuated via pneumatic actuation which is provided by the vacuum pump while the test object is connected to the apparatus.

6 Claims, 1 Drawing Sheet

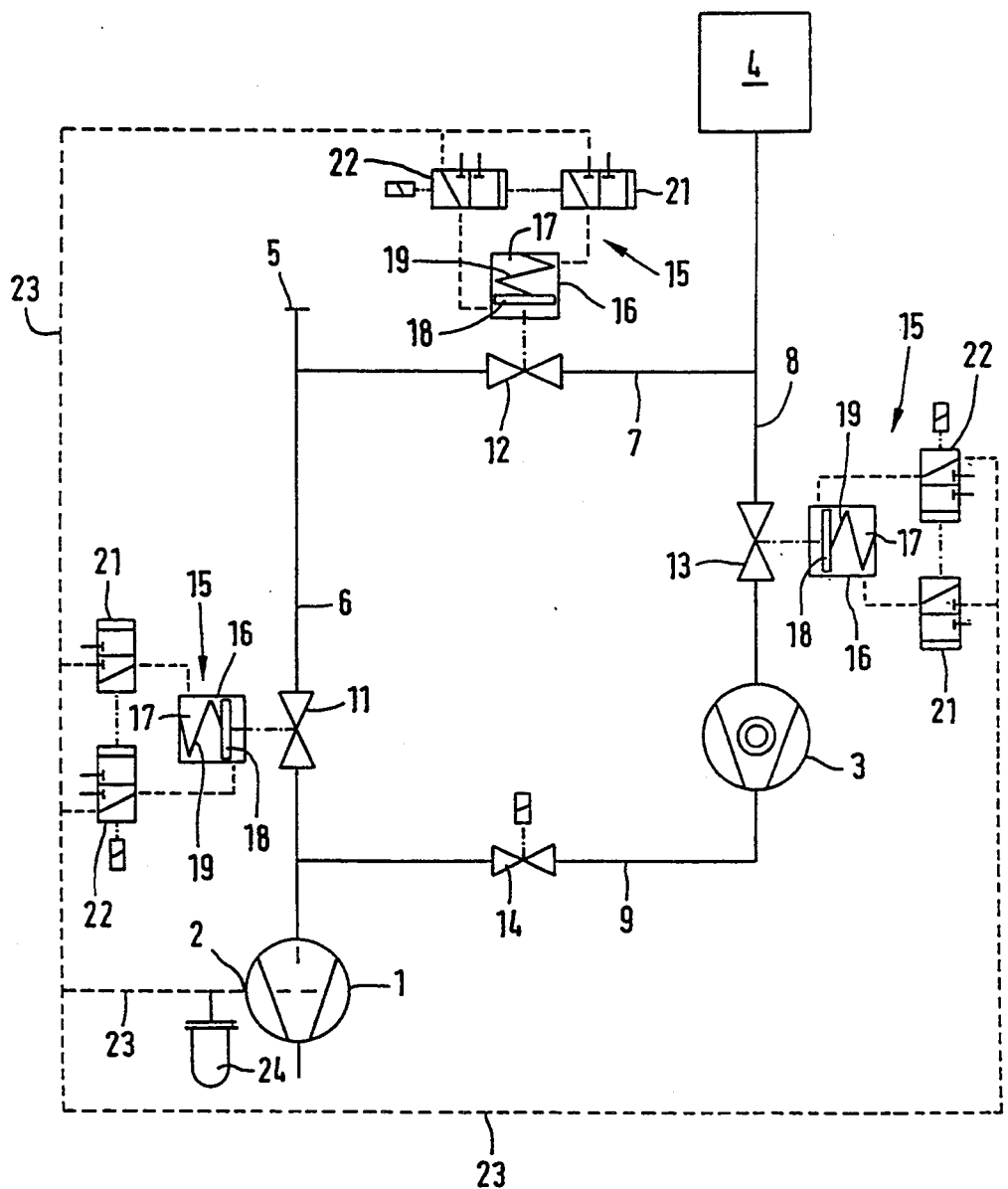

LEAK DETECTOR

BACKGROUND OF THE INVENTION

1. Field of the Invention

The present invention relates to a leak detector for vacuum leak detection applications with a vacuum pump as well as the valves which control the leak detection process.

2. Description of the Related Art

The method of producing a differential pressure in the area of the chamber walls of a test object or similar, which is to be subjected to a leak test, is well known. A possibly existing leak is detected with the aid of a test gas which is present on the side having the higher pressure, and which, in case of a leak is then able to penetrate the chamber wall of the test object. The case of vacuum leak detection the differential pressure is produced by generating a partial vacuum on one side of the chamber wall of the test object. This may be implemented by connecting the test object itself to the vacuum pump and subjecting the outside to a test gas atmosphere, be it by spraying or generation of a test gas atmosphere within a test chamber. In a different approach, the object containing the test gas is placed in a test chamber, which is then evacuated.

Therefore, a suitable apparatus for vacuum leak detection is equipped with a vacuum pump which is employed for generation of the differential pressure. Frequently gas ballast pumps are used for this purpose. Leak detectors which are equipped with a mass spectrometer For detection of the test gas must be provided with an additional high vacuum pump to produce a pressure of approximately $10^{-4}$ mbar required for operation of the mass spectrometer.

Moreover, a leak detector for vacuum leak detection requires several valves to control the leak detection process. It is known to actuate these valves electromagnetically and to equip them with a closure spring, so that all valves are returned to their closed position in the event of a power failure. Valves of this type are large, complex and thus costly.

SUMMARY OF THE INVENTION

It is the object of the present invention to reduce the complexity of the valves for a leak detector of the aforementioned kind.

These and other objects are accomplished by the introduction of pneumatically actuated valves having one each driving piston and driving cylinder and where the driving cylinders are connected via controlling valves to the vacuum pump. As the partial vacuum produced by the vacuum pump is utilized to control the valves, actuators based on the electromagnetic principle are no longer required.

If the vacuum pump present in the leak detector is of the gas ballast type, it is then convenient to connect the driving cylinders of the valves to the gas ballast port of this vacuum pump. The vacuum prevailing in the area off the gas ballast port is adequate for actuation of the valves. When the valves are actuated, the vacuum produced by the vacuum pump is not affected in any way.

If the valves are equipped with a closure spring, it is recommended to connect both sides of the driving cylinder via control valves to the vacuum pump or the gas ballast port of the vacuum pump. It is then possible to support the closing action of the spring by generation of a partial vacuum on one side of the driving cylinder, The advantage of this approach is, that the resilience of the spring and thus the size of the spring may be reduced, without having to sacrifice the rapid and reliable closing ability of the valves.

BRIEF DESCRIPTION OF THE DRAWINGS

Further objects, advantages and details of the present invention will become apparent from the following detailed description taken in conjunction with the drawing, which is a schematic representation of a leak detector.

DESCRIPTION OF THE PREFERRED EMBODIMENTS

As depicted in the schematic, the leak detector comprises vacuum pump 1 with gas ballast port 2, high vacuum pump 3 and test gas detector 4 which, for example, may be a mass spectrometer. The inlet of the leak detector is marked 5. Depending on the type of leak detection which is to be performed the test object itself or the test chamber is connected to this inlet. Inlet 5 is connected via line 6 to vacuum pump 1 and via line 7 to mass spectrometer 4. Mass spectrometer 4 in turn is connected via line 8 to the inlet of high vacuum pump 3, the exhaust of which is connected via line 9 to vacuum pump 1.

Lines 6 to 9 are equipped with valves 11 to 14, whereby valves 11 to 13 are fitted with actuation system 15 designed according to the invention. Valves 11 to 14 serve the purpose of controlling the leak detection process which mainly consists of evacuation and leak detection, preferably with varying sensitivity. Each of the valves 11 to 13 are fitted with actuation system 15 designed according to the invention. These valves comprise driving cylinder 16 forming control chamber 17. Located in this control chamber 17 are driving piston 18 and closure spring 19.

Both sides of driving cylinder 16 or control chamber 17 are connected via control valves 21, 22 3/2-way valves and via lines 23 indicated by broken lines to gas ballast port 2 of vacuum pump 1. The control valves 21, 22 are actuated at any desired time by a control arrangement which is not shown. Both valves are actuated electrically at the same time. In the absence of a current, control chamber 17, which opens the main valve, is vented from the outside and the control chamber for closing the main valve is supplied with a partial vacuum. In the on state the conditions are reversed. A partial vacuum reservoir having a volume of approximately 0.5 to 1l as well as a weak spring in the bellows ensure automatic closure of the main valve in the event of a power failure. Compared to state-of-the-art designs the level of complexity of the described actuation system devised for valves 11, 12 and 13 is relatively low. Rapid and reliable closure of the valves is ensured by the way in which the partial vacuum supports the function of spring 18.

In the described example a partial vacuum reservoir 24 is related to gas ballast port 2. This ensures rapid closure of the valves in the event of a power failure. Moreover, this prevents adverse influences in the event of a sudden intake of air in the area of the gas ballast port of pump 1.

I claim:

1. An apparatus for detecting leaks in a test object having chamber walls, the chamber walls having a first and a second side subject to differential pressure produced by production of a partial vacuum on the first side of the chamber walls, the detection being carried out by use of a test gas, said apparatus comprising:

vacuum pump means for providing the partial vacuum;

detecting means for identifying the presence of the test gas on the second side of the chamber walls;

sealed conduit means for fluidly connecting the test object to said vacuum pump means and said detecting means; and a plurality of primary control valves each being positioned in series with said sealed conduit means for controlling the leak detection process, wherein at least one of said plurality of primary control valves is controlled by an actuating means including:

a driving cylinder having a first end and a second end; and a driving piston slidably retained within said driving cylinder, said driving piston being controlled by said vacuum pump means.

2. The apparatus according to claim 1 wherein movement of said driving piston within said driving cylinder is controlled by a first and a second intermediate control valve, the first intermediate valve being fluidly connected to said first end of said driving cylinder and the second intermediate control valve being fluidly connected to said second end of the cylinder.

3. The apparatus according to claim 2 wherein said vacuum pump means includes a gas ballast vacuum pump and each of said intermediate control valves is connected to a gas ballast port of said gas ballast pump.

4. The apparatus according to claim 2 including four primary control valves, three of said four primary control valves each being controlled by one of said actuating means, each driving piston in each of said driving cylinders including a compression spring to bias its respective primary control valve in a closed condition.

5. The apparatus according to claim 2 further including a partial vacuum reservoir connected in said sealed conduit means in series between said intermediate control valves and said vacuum pump means.

6. The apparatus according to claim 2 wherein each of said secondary control valves is a 3/2-way valve.

* * * * *